No. 871,604. PATENTED NOV. 19, 1907.
W. E. MARTIN.
SIDE DELIVERY RAKE, SWATH TURNER, AND OTHER LIKE IMPLEMENT OR MACHINE.
APPLICATION FILED MAY 4, 1907.
3 SHEETS—SHEET 1.
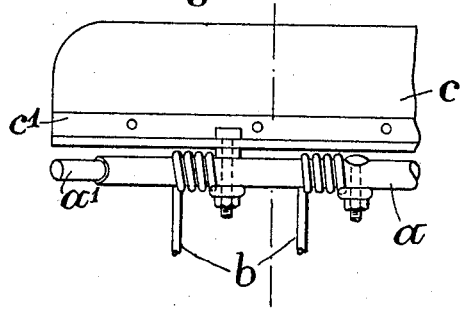
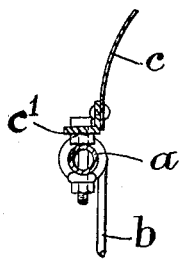
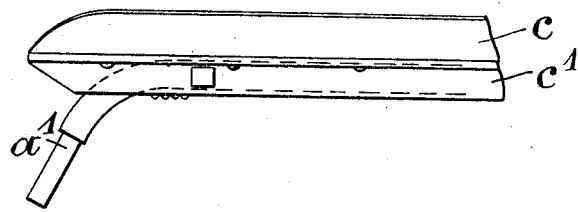
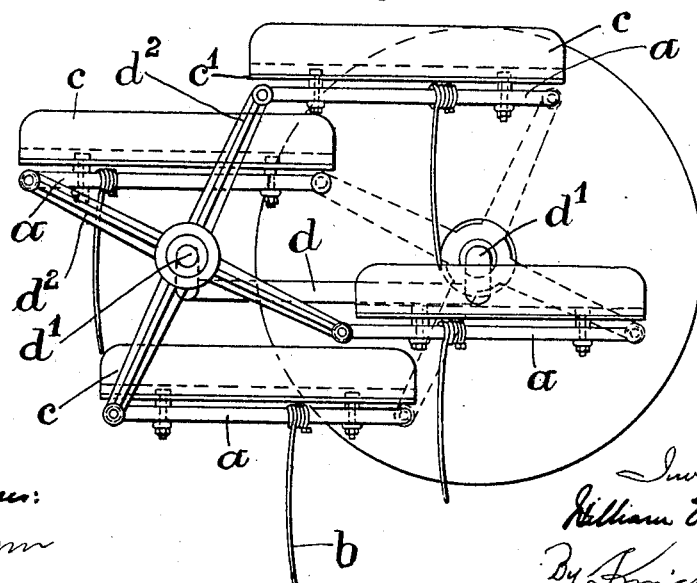

No. 871,604. PATENTED NOV. 19, 1907.
W. E. MARTIN.
SIDE DELIVERY RAKE, SWATH TURNER, AND OTHER LIKE IMPLEMENT OR MACHINE.
APPLICATION FILED MAY 4, 1907.
3 SHEETS—SHEET 2.
Fig:5
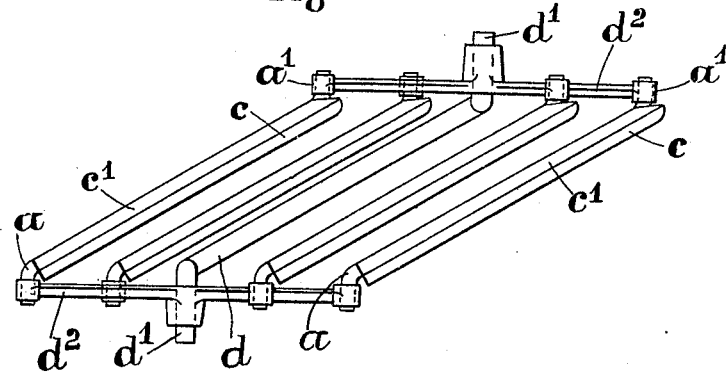
Fig:6
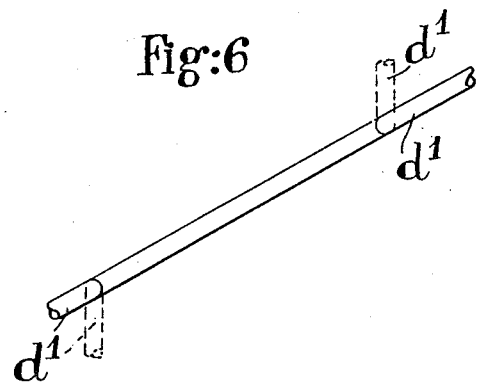
Fig:7
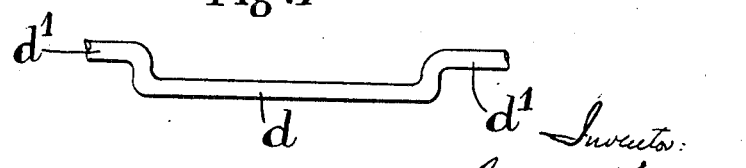

No. 871,604. PATENTED NOV. 19, 1907.
W. E. MARTIN.
SIDE DELIVERY RAKE, SWATH TURNER, AND OTHER LIKE IMPLEMENT OR MACHINE.
APPLICATION FILED MAY 4, 1907.
3 SHEETS—SHEET 3.
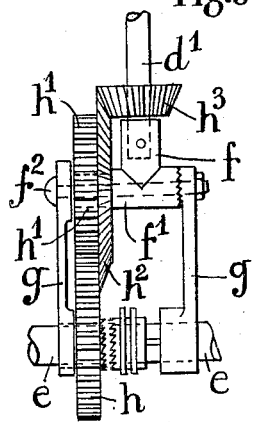
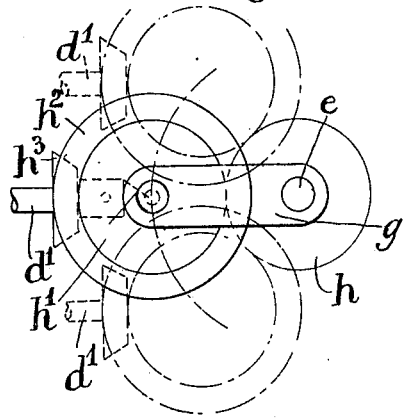
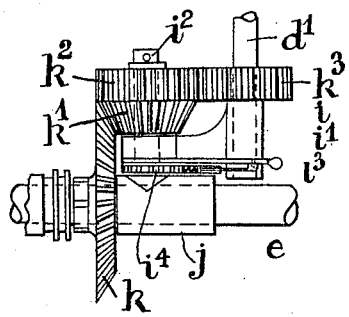
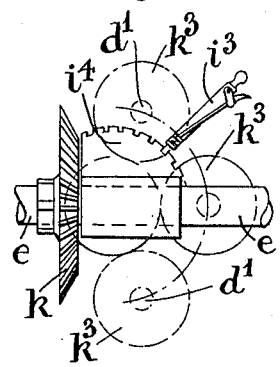
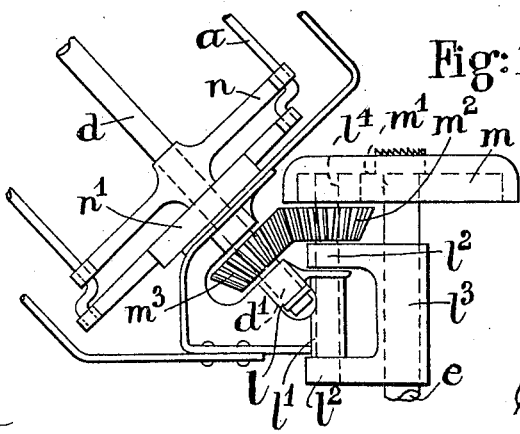

UNITED STATES PATENT OFFICE.

WILLIAM EDWARD MARTIN, OF STAMFORD, ENGLAND.

SIDE-DELIVERY RAKE, SWATH-TURNER, AND OTHER LIKE IMPLEMENT OR MACHINE.

No. 871,604.　　　Specification of Letters Patent.　　　Patented Nov. 19, 1907.

Application filed May 4, 1907. Serial No. 371,899.

*To all whom it may concern:*

Be it known that I, WILLIAM EDWARD MARTIN, a subject of the King of Great Britain, residing at Stamford, in the county of Lincoln, England, have invented new and useful Improvements in Side-Delivery Rakes, Swath-Turners, and other Like Implements or Machines, of which the following is a specification.

The invention relates to side delivery rakes, swath turners and other like implements or machines, in which the rake teeth or tines are controlled, when revolving, in a hanging or vertical position.

In order that the invention may be clearly understood and readily carried into effect, I will proceed, aided by the accompanying drawings, more fully to describe the same.

The type of machine to which this invention relates is so well known that it is not considered necessary to show a complete machine. Such machines are shown in specifications of United States Letters Patent Nos. 800,662 and 818,899.

Figure 1 is an elevation of part of a rake; Fig. 2 is a vertical section and Fig. 3 is a plan of the same; Fig. 4 is a front elevation of a complete set of revolving rakes constructed in accordance with Figs. 1, 2 and 3. In this view only some of the teeth are shown. Fig. 5 is a plan of the rakes shown in Fig. 4. Figs. 6 and 7 are respectively a plan and front elevation of the shaft or rod on which the disks, radial arms, wheels or the like, carrying the rakes, are mounted. Figs. 8 and 9 are respectively a plan and side elevation of means for supporting one end of shaft shown in Figs. 4 and 5, and for driving the disks, radial arms, wheels or the like, mounted on said shaft. Figs. 10 and 11 are respectively a plan and side elevation of modified means for supporting one end of the shaft, such as shown in Figs. 4 and 5, and for driving the disks, radial arms, wheels or the like, mounted on said shaft. Fig. 12 is a plan of means for supporting a straight shaft or a cranked shaft in a vertical plane and for driving another well known type of revolving rake.

Referring to Figs. 1 to 5, $a$ is the rake head, $b$ are the teeth carried by the rake head $a$, and $c$ is a plate or bar fixed to and above the rake head $a$, which has its upper part bent forward so as to present a concave face to the hay or the like, which concave face turns the hay or the like forward and prevents any of it gathering on the top or head of the rake. When bent rake heads $a$ are used, such as shown in Figs. 4 and 5, the plate or bar $c$ is preferably carried beyond the rearward bearings $a'$ of the rake head $a$, as shown at Figs. 3 and 5, to prevent any hay or the like gathering on said bearings. The said bar $c$ can be made in one piece and be attached to the rake head $a$ in any suitable manner, but in order to give greater strength to the rake head $a$, I prefer to employ angle iron $c'$ to form the base and sheet iron $c$ to form the upper part. The parts $c$ and $c'$ are preferably riveted together and the angle iron $c'$ is bolted to the rake head $a$.

As shown in Figs. 4 to 7, the shafts or rods $d$, $d'$, on which the disks, radial arms, wheels or the like $d^2$, are mounted, are so constructed that much longer teeth or tines $b$ can be employed to more effectively deal with the crop without increasing the diameter of the disks, radial arms, wheels or the like $d^2$, and consequently increasing the draft of the machine. The lower ends of the teeth or tines $b$ may be below the axis of the revolving disks, arms or the like $d^2$, as shown in Fig. 4. For this purpose the main portion of the shaft $d$ is bent downwards so as to lie below the portions $d'$ on which the disks or arms $d^2$ are mounted, and these two end portions can be set in the same vertical plane with the main portion $d$, as shown in full lines in Figs. 6 and 12, or at an angle thereto as seen in Fig. 5, and in broken lines in Fig. 6.

Referring to Figs. 8 and 9, $e$ is a part of the main or driving shaft of the machine or implement, and $d'$ is the end of the shaft or rod on which the disks or arms $d^2$ are mounted. By means of the construction shown in these figures the position of the end $d'$ can be regulated above or below the main or driving shaft $e$, and, consequently, this end of the rakes can be set to work at the required height. Various means are already known for raising or lowering the other end of the shaft $d$, any of which I may employ.

Instead of attaching one end $d'$ of the shaft $d$, directly to the main axle $e$ as heretofore, I mount it in a socket $f$ having a sleeve $f'$ carried by the outer ends of arms $g$ mounted or hung on the main axle $e$. The sleeve $f'$ has teeth at one end and is connected to the arms $g$ by the bolt $f^2$, one of the arms $g$ having teeth to engage with the teeth on the sleeve $f'$. The end $d'$ of the shaft $d$ carrying the revolving rakes, after the bolt $f^2$ is released, is thus capable of being partially revolved around the main axle $e$, so that the rakes at this end can be set higher or lower as desired. When the bolt $f^2$ is again tightened the parts are locked in the new position by the engagement of the teeth on the sleeve $f'$ with the teeth on the arm $g$. The end $d'$ of the shaft $d$ is shown both above and below the main axle $e$ in broken lines in Fig. 9. The arms $g$ may however be fixed in any required position by any other suitable means, such as a bolt, set screw or lever and quadrant; but such means are not shown as they are well understood. In this mechanism the toothed wheel $h$, driven by its clutch on the main axle, meshes with the toothed wheel $h'$ fixed to the bevel toothed wheel $h^2$, which latter gears with the bevel pinion $h^3$ fixed to the disk, radial arm or the like $d^2$.

In the modification shown at Figs. 10 and 11, the end $d'$ of the shaft $d$ is mounted in a socket $i$ formed on an arm $i'$ pivotally connected to a bracket $j$ on the main or driving axle $e$. The arm $i'$ may be moved around its pivot $i^2$ by means of the lever $i^3$ and may be fixed in any desired position by a quadrant $i^4$ or by other suitable means, as is well understood. The gearing consists of the bevel toothed wheel $k$ driven by its clutch on the main axle, which gears with the bevel pinion $k'$ mounted on the pivot or pin $i^2$. This bevel pinion $k'$ is fixed to, or made in one piece with, the toothed wheel $k^2$, which meshes with the toothed wheel $k^3$ fixed to the disks or radial arms $d^2$. The end $d'$ is shown both above and below the main axle $e$ in broken lines in Fig. 11.

In the modification shown in Fig. 12, the end $d'$ of the shaft $d$ is mounted in a socket $l$ fixed to a sleeve $l'$ carried by the outer ends of arms $l^2$, which are formed integral with a sleeve $l^3$ hung on the main axle $e$. The sleeve $l'$ is connected to the arms $l^2$ by a shaft $l^4$. When the arms $l^2$ are rotated around the main axle $e$, the sleeve $l'$ and socket $l$ are raised or lowered, thereby raising or lowering this end of the revolving rakes $a$. The arms $l^2$ are fixed in any desired position by any suitable mechanism, such as a lever and quadrant or set screw. The gearing consists of an internally toothed wheel $m$ gearing with the toothed wheel $m'$ fixed to or formed integral with the bevel pinion $m^2$ gearing with the bevel pinion $m^3$. This latter drives the shaft $d$, or a sleeve thereon, and gives motion to the radial arms $n$ and eccentric $n'$, by means of which the rakes $a$ are rotated and always retained in a hanging vertical position in a manner well understood.

Having now particularly described and ascertained the nature of my said invention and in what manner the same is to be performed I declare that what I claim is:—

1. The combination with a side delivery rake, swath turner or like agricultural implement having a plurality of rakes, means for retaining them in a vertical position, means for moving the rakes around a central rod by which they are carried, and a bar fixed to and above the top of each rake head, of a concave face to said bar, to turn the crop forward and prevent it gathering on the rake head, substantially as set forth.

2. The combination with a side delivery rake, swath turner or like agricultural implement having a plurality of rakes, means for retaining them in a vertical position, means for moving the rakes around a central rod by which they are carried, and a bar fixed to the top of each rake head, of a concave face to said bar, to turn the crop forward and prevent it gathering on the rake head, and a projecting end to said bar carried beyond the rearward bearings to prevent the crop gathering on said bearings, substantially as set forth.

3. The combination with a side delivery rake, swath turner or like agricultural implement having a plurality of rakes, means for retaining them in a vertical position and means for moving the rakes around a central rod, of an angle iron bolted to the rake head and a concave plate riveted to said angle iron, substantially as shown and described.

4. The combination with a side delivery rake, swath turner or like agricultural implement having a plurality of rakes, means for retaining them in a vertical position, a central rod by which the rakes are carried, and means for moving the rakes around the rod, of a depressed portion in the central rod located below the ends on which the rakes are supported, substantially as set forth.

5. The combination with a side delivery rake, swath turner or like agricultural implement having a plurality of rakes, means for retaining them in a vertical position, a central rod by which the rakes are carried, a toothed wheel on said rod for moving the rakes around the rod, a main axle and a socket for supporting one end of the central rod on the main axle, of means for raising, lowering and fixing said socket in certain positions and suitable gearing for communicating motion from the main axle to the toothed wheel on the said rod in any position in which said socket may be fixed, substantially as set forth.

6. The combination with a side delivery rake, swath turner or like agricultural implement having a plurality of rakes, means for retaining them in a vertical position, a central rod by which the rakes are carried, a toothed wheel on said rod for moving the rakes around the rod, a main axle and a socket for supporting one end of the central rod on the main axle, of an arm carrying said socket at its outer end, a bracket on the main axle to which said arm is pivotally connected, means for fixing said arm in certain positions and suitable gearing for communicating motion from the main axle to the toothed wheel on said rod in any position in which said socket may be fixed, substantially as set forth.

In witness whereof I have hereunto set my hand in presence of two witnesses.

WILLIAM EDWARD MARTIN.

Witnesses:
CLAUDE K. MILLS,
WM. GIRLING.